United States Patent
Allen et al.

(10) Patent No.: US 6,895,453 B2
(45) Date of Patent: May 17, 2005

(54) SYSTEM AND METHOD FOR IMPROVED HANDLING OF FIBER CHANNEL REMOTE DEVICES

(75) Inventors: James P. Allen, Austin, TX (US); Marcus Bryan Grande, Pflugerville, TX (US); Madhuranath Narasipur Krishna Iyengar, Austin, TX (US); Robert George Kovacs, Austin, TX (US); John Leslie Neemidge, Round Rock, TX (US); Marshon Larapheal Robinson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 09/810,060

(22) Filed: Mar. 15, 2001

(65) Prior Publication Data

US 2002/0162010 A1 Oct. 31, 2002

(51) Int. Cl.[7] .............................................. G06F 13/00
(52) U.S. Cl. .................................. 710/33; 710/3; 710/8
(58) Field of Search .............................. 710/3, 8, 9, 10, 710/11, 31, 33, 7, 18, 28, 105, 315; 712/215, 28; 714/758, 25

(56) References Cited

U.S. PATENT DOCUMENTS

| | | | | |
|---|---|---|---|---|
| 5,941,972 A | * | 8/1999 | Hoese et al. ................. | 710/315 |
| 6,061,794 A | * | 5/2000 | Angelo et al. ............... | 713/200 |
| 6,343,324 B1 | | 1/2002 | Hubis et al. ................. | 709/229 |
| 6,360,306 B1 | * | 3/2002 | Bergsten ...................... | 711/162 |
| 6,425,035 B2 | * | 7/2002 | Hoese et al. ................. | 710/105 |
| 6,647,528 B1 | * | 11/2003 | Collette et al. ............. | 714/758 |
| 6,697,875 B1 | | 2/2004 | Wilson ........................ | 709/245 |
| 6,711,632 B1 | | 3/2004 | Chow et al. .................. | 710/29 |
| 2002/0178304 A1 | | 11/2002 | Camara et al. ............... | 710/11 |

OTHER PUBLICATIONS

"SCS1–3 Primary Commands," *Draft ANSI Standard X3.301–199x*, Mar. 28, 1997, p. 32–39, 123–30.

* cited by examiner

*Primary Examiner*—Jeffrey Gaffin
*Assistant Examiner*—Alan Chen
(74) *Attorney, Agent, or Firm*—Van Leeuwen & Van Leeuwen; Joseph T. Van Leeuwen; Diana L. Roberts

(57) ABSTRACT

In traditional Fiber Channel systems, remote devices connected to the Fiber Channel network using a bridge or included in a storage enclosure are not tracked. If a remote device, such as a SCSI disk device, is removed or swapped, data errors such as data corruption can result. A device identifier corresponding to the remote device is obtained from the remote device. The device identifier may include the remote device's serial number and other identifying information pertaining to the device. The first time the remote device is used, the device identifier is obtained and stored by the Fiber Channel device using the remote device. This device identifier is compared with subsequently obtained identifiers. If the identifiers match, communication with the remote device occurs. However, if the identifiers do not match, an error condition is raised indicating that the remote device has been removed or swapped.

21 Claims, 7 Drawing Sheets

Before SCSI Device Change

---

After SCSI Device Change

SYSTEM AND METHOD FOR IMPROVED HANDLING OF FIBER CHANNEL REMOTE DEVICES

RELATED APPLICATIONS

This application is related to the following U.S. Patent Applications each filed on the same day and each having the same inventors and assignee: "System and Method for Fibre Channel Tracking of SCSI Identifiers in Known Configurations", Appl. No. 09/810,059, filed Mar. 15, 2001, U.S. Pat. No. 6,792,479, and "System and Method for Fibre Channel Tracking of SCSI Identifiers in Unknown Configurations", Appl. No. 09/810,061, filed Mar. 15, 2001, now abandoned each by Allen, Grande, Iyengar, Kovacs, Neemidge, and Robinson, and each assigned to International Business Machines Corporation.

BACKGROUND OF THE INVENTION

1. Technical Field

The present invention relates in general to a method and system for using a Fibre Channel. More particularly, the present invention relates to a system and method for tracking remote devices used by Fibre Channel connected devices.

2. Description of the Related Art

Computer systems in general and International Business Machines (IBM) compatible personal computer systems in particular have attained widespread use for providing computer power to many segments of today's modern society. Computer systems typically include a system processor and associated volatile and non-volatile memory, a display area, input means, and often interfaces, such as a network interface or modem, to other computing devices.

One of the distinguishing characteristics of these systems is the use of a system board to electrically connect these components together. These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network. Computer systems can also be interconnected using a Fibre Channel network. By linking to other computer systems, a computing device can use resources owned by another computing device. These resources can include files stored on nonvolatile storage devices and resources such as printers and storage area networks (SANs).

Data Storage has become an increasingly important issue for business people and IT professionals. Organizations store records in databases regarding customers, products, competitors, and other records. This storage space becomes expensive when more data is stored. These expenses can be potentially prohibitive for small businesses who must employ people to manage the data, purchase storage equipment and software, and ensure that the data is properly protected from disaster or storage device failure. A solution to this problem comes in the form of an emerging technology called Fibre Channel. Fibre Channel can be used to connect devices to each other, including connecting computer systems to storage devices such as SAN devices.

Fibre Channel is a high speed (100 to 1000 Mbps currently, with speeds increasing quickly over time) medium used for data transfer and storage. It is essentially a serial data channel preferably created over fiber optic cabling. Fibre Channel provides a logical bi-directional, point-to-point connection between a host and a device. Similar to networking technologies using local area network (LAN) or wide area network (WAN) configurations, Fibre Channel also is used to connect PCs, servers, printers, and storage devices. Because Fibre Channel allows the use of fiber optic cabling, connections along a Fibre Channel network makes it possible to transfer data at greater distances. In addition, Fibre Channel makes high-speed data transfers possible. Fibre Channel also provides increased bandwidth over communication channels.

Channels and networks are the two primary ways that data is transferred between devices. Such devices include processors and peripherals such as printers and storage devices. Channels transfer data through switched or direct point to point connections. Channels work by creating a fixed connection between the source and destination devices until the transfer is complete. Channels transfer data at high speeds and are very economical. Networks (i.e., LAN or WAN), on the other hand are collections of nodes such as processors, print devices, and workstations. Connections on networks are typically slower than those made via channels. Also, because networks are software intensive, they are much more expensive due to upgrade and compatibility issues. Channels work best among few devices and connect via predefined addresses. Networks, on the other hand, can handle multiple requests among multiple connections.

Fibre Channel is hybrid of both network and channel methods. Consequently, Fibre Channel is often considered a new I/O (input/output) interface that combines the best of networks and channels. In addition, Fibre Channel systems can be configured in different ways depending on needs of the user, thus providing flexibility in an ever changing systems environment.

Although the ideal medium for Fibre Channel is fiber optic cabling, Fibre Channel can also be used with a variety of cable types such as copper, coaxial cables or Unshielded twisted pair (UTP) wires. Fiber optic cabling is generally preferred on a Fibre Channel system for purposes of increased speed and reliability. Fiber optic cabling works by using photons to transmit digital signals. A laser light connected to a device pulses in binary format (0's and 1's). A light emitting diode (LED) codes and transmits the signal from one end of the cable. This signal is subsequently decoded at the other end of the cable by a photo-detector connected to the receiving device. Fiber optic cables do not have the same challenges that are associated with copper cabling. These challenges include attenuation (loss of signal strength) and noise. Fiber optic cables are also more secure than copper cables because crosstalk does not occur with Fiber Optic cables (crosstalk is interference caused by a signal transferring from one circuit to another, as on a telephone line). This insures that data being transferred across a network gets to its destination intact which makes the stored data more reliable for the user.

Fibre Channel technology makes use of classes of service to define messaging types (communication between devices). According to the ANSI standard, a Fibre Channel system's classes of service can be 1, 2, 3, 4 or 6. These classes make it possible to configure Fibre Channel systems according to the needs of the users.

In a class 1 configuration, there is a dedicated channel between two connection devices. In this configuration, if a host and a device are connected, no other host uses the connection. The advantage of using service class 1 is speed and reliability which is an excellent combination for mass storage use such as in a data library. Class 2 is known as a "connectionless" service. Class 2 provides a frame-switched link that guarantees delivery of packets from device to device. It also provides packet receipt acknowledgments. In this configuration, bandwidth is shared among several devices, as there is no dedicated link. The third Fibre Channel service class (Class 3) is called "unacknowledged connectionless service" and is often used for messages that do not need to be acknowledged, as there is no acknowledgement with a Class 3 configuration. Class 4 is called "fraction bandwidth connection oriented" and allows a device to reserve a portion of the overall bandwidth and use the reserved portion to create a dedicated channel between devices (similar to Class 1, except only part of the available bandwidth is used for the dedicated channel). Class 6 is called "multicast" and is used for one-to-many broadcast communications over the Fibre Channel network. There is an additional Fibre Channel service class called "intermix," which creates a dedicated connection like that of class one, but it also allows class 2 traffic to access the link. This method is efficient and allows for greater bandwidth because more than one connection can access the system at any time.

The Fibre Channel Structure, or architecture, is set forth in the table below. The layers in the table represent a different function that exists within a Fibre channel system.

| Layer | Function |
| --- | --- |
| FC-0 | Physical characteristic specifications |
| FC-1 | Encoding/Decoding |
| FC-2 | Data Transfer Sequence Management/Data Framing |
| FC-3 | Bandwidth Management |
| FC-4 | Application/Protocol Management |

FIG. 1 shows various topologies that are used with Fibre Channel. These topologies include Loop topology 110, Point-to-Point topology 120, and Fabric topology 100. Within these topologies, several connection types can exist between two Fibre Channel nodes. These include point-to-point connections, cluster connections, and switched connections. Point-to-point connections are typically used for high-speed connections at maximum distances. In this type of connection, no other device accesses the connection while two devices are communicating. Cluster connections connect multiple devices such as workgroup clusters, while switched connections allow more than one simultaneous connection of devices. A transceiver is a device that connects cabling to devices on any network or system and makes data transmission possible between devices.

Fabric topology 100 permits multiple paths between two ports on the Fabric. Loop topology 110, on the other hand, uses one active circuit at a time. Loop and fabric topologies can be combined. In addition, a fabric may contain one or more loops. If a link in a point-to-point topology 120 fails, communication between that pair of ports stops, while communication between other point-to-point connected Ports continues.

Fabric topology 100 includes a switch or a network of switches. These switches create the connections between devices in order for frames to be transported between the connections based on specifying a destination identifier (ID). If the destination ID is determined to be invalid, the fabric rejects the transmission. The function of the Fabric is similar to that of a telephone system, which provides a complete, low-cost connectivity solution. Fibre Channel establishes temporary, direct, and full-bandwidth connections between devices. Fibre Channel makes use of unique address identifiers, similar to telephone numbers, to connect processors to other processors or peripherals at distances currently reaching up to 10 km.

Devices are connected on Fibre Channel systems using various interconnection topologies. Interconnection devices available for use on Fibre Channel are switches, hubs, and bridges. The ability of Fibre Channel to use different interconnect devices makes it scalable depending on user needs. For small Fibre Channel networks, hubs and bridges may be used for connecting devices in a topology called Fiber Channel Arbitrated Loop (FC-AL). As Fibre Channel networks get larger and network demands increase, switching may be implemented. A switched Fibre Channel network is called a "fabric." A fabric is simply the underlying switching architecture used by a Fibre Channel switch. A fabric may contain many loops interconnected with switches.

Multiple protocols can be used in a Fibre Channel network. Once such protocol is the SCSI (Small Computer System Interface). SCSI is a common storage interface for I/O systems. However, SCSI environments have challenges, including limited bandwidth, limited distances, and limited device connections. An advantage of Fibre Channel is increased transmission speed and transmission distance. Data can be sent over longer distances using Fibre Channel because of fiber optic cabling, whereas SCSI only allows data transfers at distances up to 30 meters. Another advantage of Fibre Channel is that it allows millions of device connections, whereas SCSI adapters are usually allowed only eight to sixteen device connections. In addition, the Fibre Channel allows a wide variety of upper-level protocols (ULPs) to run on top of the Fibre Channel interconnect. One ULP that often runs on top of the Fibre Channel interconnect is the SCSI protocol.

Storage Area Networks are increasing in popularity due to high demand by users who need to store large volumes of data. In addition, the cost of magnetic media that comprise Storage Area Networks continues to fall, thus making large data networks both attractive and feasible. The data in a Storage Area Network might be used in data warehouses or decision support systems used by businesses. There are also new applications for Storage Area Networks such as fault tolerant RAID clusters. Storage Area Networks can operate using network interconnect devices such as SCSI, Fibre Channel, HIPPI, or Sonnet. A SAN is a group of storage devices connected via a network of connections to hosts machines across greater distances than are possible on a traditional LAN. Storage Area Networks enable users to store large volumes of data at remote locations. These remote locations, called libraries, make it possible for businesses to store their data, whether for the purpose of creating backups or moving data management away from the primary site. If used for storage, a SAN will typically contain many high capacity Redundant Arrays of Inexpensive Disks (RAID) devises configured for the specific interconnect device used on the SAN. Other types of data that can be stored on SAN devices include databases, video, and streaming media. On a Storage Area Network using a Fibre Channel interconnect, backups can be performed throughout the workday, thereby eliminating timely and costly after hours backups. Storage Area Networks eliminate bottlenecks that make it difficult to access data on traditional networks.

On a Fibre Channel loop or fabric, each device connected to the Fibre Channel interconnect has a node name (Node_

Name) and one or more port names (Port_Names). The Node_Name and Port_Names are unique, 64-bit identifies assigned to the specific device, or node, and its ports. Node_Names and Port_Names are assigned so that no two nodes in the world have the same Node_Names and Port_Names. Together, the Node_Name and Port_Names are referred to as a devices World Wide Name (WWN).

In a Fibre Channel network, each device on the network has a dynamically-assigned Fibre Channel address. The address is assigned when the device attaches to the Fibre Channel loop or fabric. Due to the dynamic nature of the Fibre Channel address assignment, the address alone is not sufficient to completely identify a device. For example, device "A" can be attached to a fabric and assigned a dynamic address of 0x8. Device "A" may subsequently be removed from the fabric and a different device, device "B", may be attached to the fabric and dynamically assigned address 0x8 since that address was relinquished by device "A" upon its removal from the fabric. If another device ("C") in the fabric was previously communicating with device "A" (perhaps a hard drive) at address 0x8 and later continued communicating with address 0x8 after device "B" was inserted at that address, incorrect data could be written to device "B" causing data corruption or other errors.

In order to deal with the above-described situation, Fibre Channel networks use the devices' WWN to uniquely identify the devices on the network. An entity called a "NameServer" exists in the Fibre Channel fabric to keep track of WWNs. The NameServer maintains a mapping of dynamically assigned addresses with the devices' WWNs for all devices on the fabric. When a device is added to, removed from, or even moved to another place on the network (which may also cause a change in the dynamic address), the NameServer is updated with the new WWN to dynamic address mapping. In this manner, referring back to the previous example, if device "C" wanted to communicate with device "A", device "C" would request the address of device "A" from the NameServer. Because device "A" was removed from the fabric, device "C" would not receive address 0x8 from the NameServer since that address now belongs to device "B".

Unfortunately, the above-described method of identifying devices using the device's WWN does not always ensure that devices are uniquely identified. For example, devices, such as Fibre Channel to SCSI bridges and storage enclosures create challenges for users of the Fibre Channel network.

One way that SCSI devices, such as disk drives and SAN clusters, are accessed by Fibre Channel connected devices is through a Fibre Channel to SCSI bridge or through a storage enclosure. A Fibre Channel to SCSI bridge, an example being a SAN data gateway, connects a Fibre Channel network on one side of the bridge and to one or more SCSI devices on the other side of the bridge. From the perspective of the Fibre Channel network, the bridge appears to be a single device with its own address and WWN, for example device "D". In reality, however, the bridge (device "D") may have a number of SCSI devices attached to it—for example, SCSI disks "X", "Y", and "Z." To devices on the Fibre Channel network, the disks appear as a single device (device "D"). If one of the disks is changed, for example disk "X" is removed and replaced with disk "W", the change is not noticed by the other devices because the address associated with the Fibre Channel connected device (device "D") has not been changed. The inability of Fibre Channel connected devices, such as device "A", to detect the SCSI disk change can cause problems such as writing data to the wrong disk, leading to disk corruption.

A storage enclosure poses similar challenges for the Fibre Channel network. Many Fibre Channel storage enclosures present a native Fibre Channel connection to the network but actually contain one or more SCSI disks within the enclosure. Similar to the challenge outlined above, if one of the SCSI disks within the enclosure is removed or swapped out, other devices Fibre Channel devices that may be using the SCSI disk are unaware of the change and, therefore, may write to the wrong disk causing data corruption.

A challenge, therefore, with Fibre Channel connected devices is being able to uniquely identify devices connected to the network through a bridge. Consequently, what is needed is a system and method for uniquely identifying and tracking devices connected to a bridge or contained within a storage enclosure.

SUMMARY

It has been discovered that a unique identifier, such as a device's vendor identifier, product identifier, and serial number can be obtained from devices attached to the Fibre Channel network through a bridge or storage enclosure. A command protocol, such as SCSI, is used to communicate with a device attached to a Fibre Channel to SCSI bridge or contained within a storage enclosure (the "remote devices"). A unique identifier, such as a device's vendor identifier, product identifier, and serial number, stored within the remote device is returned to the Fibre Channel connected device or devices (the "FC device"). The unique identifier received from the remote device is stored by the requesting FC device.

During subsequent communications with the remote device, the unique identifier is again requested by the FC device. If the subsequently received unique identifier matches the previously stored unique identifier, the system is assured that the remote device has not been removed or swapped. On the other hand, if the subsequently received unique identifier does not match the previously stored unique identifier, an error condition occurs preventing the FC device from reading or writing data to the remote device, thus preventing data errors and data corruption.

A remote device is either in a known or unknown configuration. In a known configuration, the location of the remote device's serial number is predetermined based on the vendor that provided the device (the vendor identifier) and the product model number (product identifier). A remote device is queried using a standard SCSI INQUIRY command to ascertain the remote device's vendor identifier and product identifier. These pieces of information are used to select a predetermined method for obtaining the remote device's serial number. For example, a lookup table can be employed with an entry for all known remote devices. If the vendor identifier and/or product identifier is located in the lookup table, then a corresponding method is retrieved. The retrieved method, for example a software routine or module, is used to request the serial number from the known device.

On the other hand, if the configuration is unknown (i.e., the received vendor identifier and/or product identifier are not found in a lookup table), then the SCSI device is examined to identify the device serial number. First, a determination is made through a query of what information pages are supported through the device using a first SCSI INQUIRY command. If a unit serial number page is supported, that page is retrieved using a second SCSI INQUIRY command. If a unit serial number page is not supported, then a determination is made whether a device identification page is supported. If it is supported, it is retrieved using a second SCSI INQUIRY command. If neither a unit serial number page nor a device identification page is supported, a determination is made whether the device supports ASCII Operation/Information pages. If such pages are supported, they are requested using one or more SCSI INQUIRY commands. Finally, if neither unit serial number pages, device identification pages, nor ASCII Operation/Information pages are supported, vendor specific fields are retrieved using a one or more SCSI INQUIRY commands and the serial number, for the remote device is ascertained.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
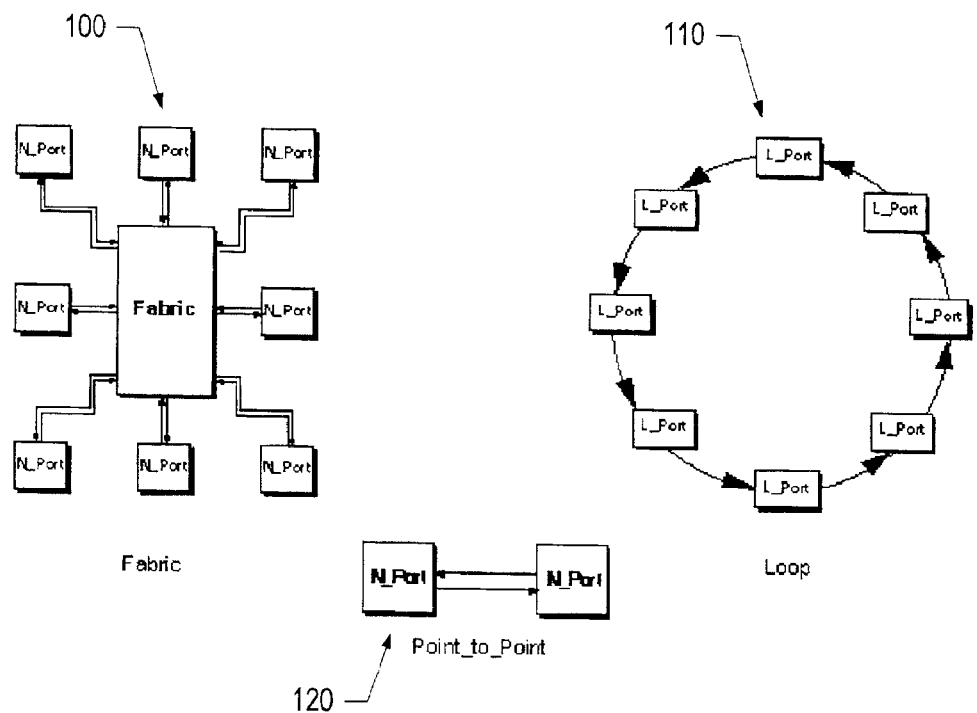
FIG. 1 (prior art) shows three Fibre Channel topologies used to connect devices.

FIG. 1 shows aspects of the prior art and is described in the Description of the Related Art subsection found in the Background section above.

Figure 2:
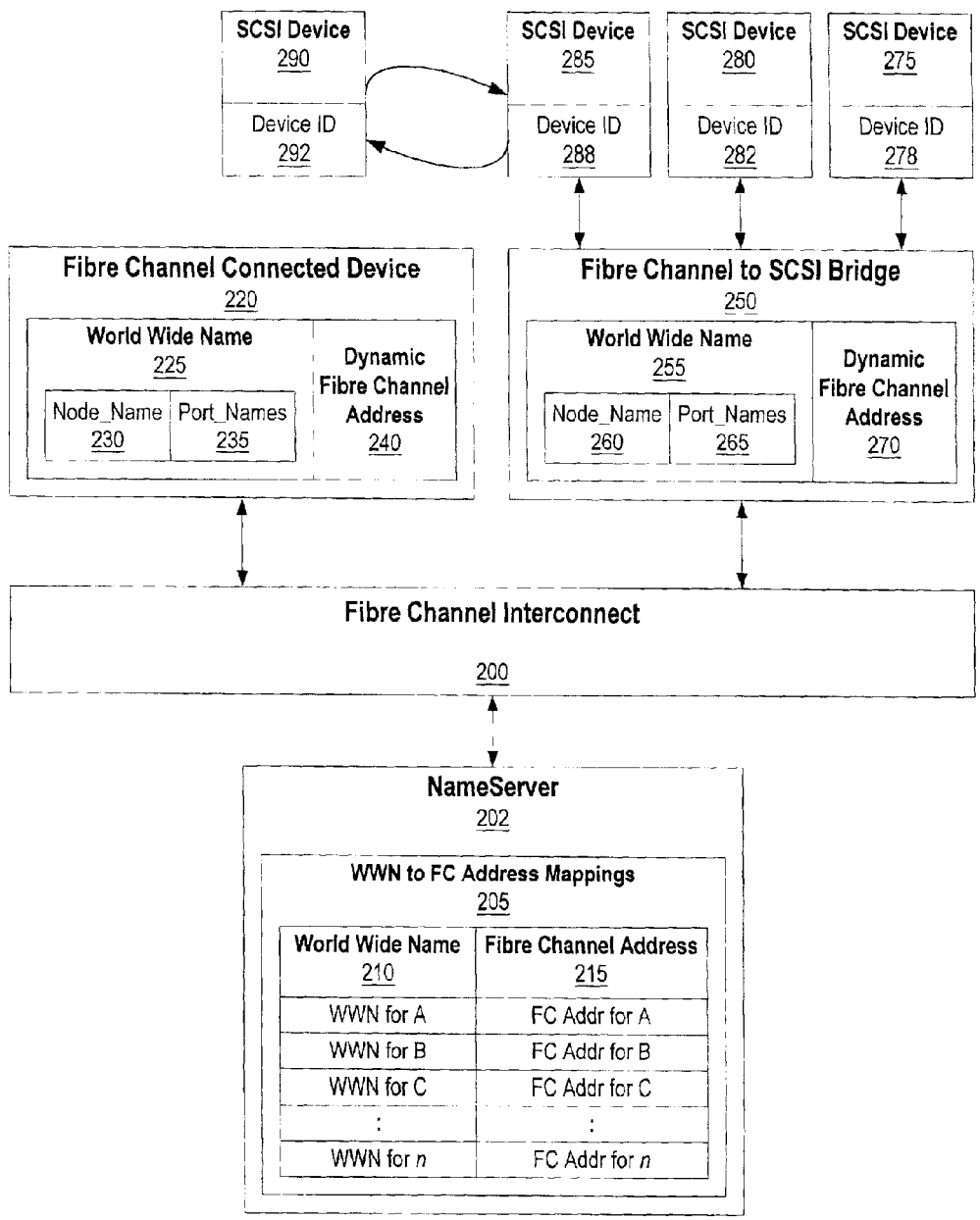
FIG. 2 shows a block diagram of a Fibre Channel network including remote and local devices.

FIG. 2 shows a block diagram of a Fibre Channel network. Fibre Channel interconnect 200 is any Fibre Channel topology, such as a fabric or a loop, allowing devices to connect to the interconnect and communicate with one another. NameServer 202 is an entity connected to Fibre Channel interconnect 200 that keeps track of the devices currently attached to the interconnect (local devices). In order to keep track of the connections, NameServer 202 includes mappings table 205. When a device is inserted into Fibre Channel interconnect 200, NameServer 202 receives the dynamic address (Fibre Channel Address 215) associated with the inserted device and World Wide Name 210 uniquely identifying the inserted device. This information is added to mappings table 202. When a device requests to communicate with another local device, the information maintained in mappings table 202 is used to retrieve address information and verify that the local device has not been removed or swapped with another local device. For example, mappings table 205 includes sample entries for devices "A", "B", and "C". Each of the devices has a World Wide Name and a dynamic Fibre Channel Address. If "A" requests to communicate with "B", the information in mappings table 205 can be used to determine the dynamic address of "B" and also ensure that "B" has not been swapped out or removed. If another device, "X", is found to be at the Fibre Channel address formerly associated with "B" then device "A" can ascertain that "B" has either been swapped out with "X" or has otherwise been removed from Fibre Channel interconnect 200.

As indicated above, NameServer 202 also receives information when a device is removed from Fibre Channel interconnect 200. For example, if NameServer 202 receives a message that device "A" has been removed from Fibre Channel interconnect 200, the information about device "A" is removed from mappings table 205 and the dynamic Fibre Channel address that used to correspond to "A" is free to be assigned to another device that is inserted in the loop or fabric.

A Fibre Channel connected host device, such as Fibre Channel Host Device 220, may be a computer system or any other device that can be inserted in the loop or fabric. Fibre Channel Host Device 220 includes World Wide Name 225. World Wide Name 225 includes static information that uniquely identifies the device. World Wide Name 225 includes Node_Name 230 that uniquely identifies the device as well as one or more Port_Names 235 that identify one or more communication ports included with the device. Another device usually requests to communicate with a particular port, identified with a Port_Name, included with a particular device. Fibre Channel Host Device 220 also includes dynamic Fibre Channel Address 240. Dynamic Fibre Channel Address 240 is assigned when Fibre Channel Host Device 220 is inserted and connected to Fibre Channel interconnect 200. When the device is removed from Fibre Channel interconnect 200, Dynamic Fibre Channel Address 240 is no longer assigned to Fibre Channel Host Device 220 and may be re-assigned to another host device that is inserted into the Fibre Channel loop or fabric (i.e., Fibre Channel interconnect 200).

Fibre Channel to SCSI Bridge (Bridge 250) is a device that connects one or more SCSI devices to Fibre Channel interconnect 200. From the perspective of other devices attached to Fibre Channel interconnect 200, Bridge 250 appears to be just another Fibre Channel attached device. Similar to Fibre Channel Host Device 220, Bridge 250 includes World Wide Name 255 (including both Node_Name 260 and one or more Port_Names 265) and dynamic Fibre Channel Address 270. Moreover, NameServer 202 includes information about Bridge 250's World Wide Name and dynamic Fibre Channel Address in mapping table 205, the same as information maintained about other devices currently attached to Fibre Channel interconnect 200. As its name implies, however, Bridge 250 serves as a gateway to other devices.

In the example shown, Bridge 250 serves as a gateway to SCSI devices. SCSI devices 275, 280, and 285 are each accessible by Fibre Channel devices through Bridge 250.

The SCSI devices may include disk drives, server as a storage array, or provide other types of functions. Each of the SCSI devices also includes a unique identifier. SCSI device 275 includes device identifier 278, SCSI device 280 includes device identifier 282, and SCSI device 285 includes device identifier 288. The respective device identifiers preferably include the vendor identifier for the device, the product identifier for the device, and the serial number corresponding to the device. While the device identifiers uniquely identify the respective SCSI devices, this information is normally neither tracked nor maintained by NameServer 202 or other devices attached to Fibre Channel interconnect 200. In the example shown, SCSI device 285 is about to be swapped out for SCSI device 290. While traditional Fibre Channel implementations would be unaware of the swap, the present invention tracks the device identifiers associated with the SCSI devices and, therefore, Fibre Channel devices (such as Fibre Channel Host Device 220) detect that the SCSI device swap occurred. Using the present invention, Fibre Channel devices receive device identifier 292 after the swap occurs. This device identifier is compared with the previous device identifier (device identifier 288). Because the device identifiers do not match, the Fibre Channel device determines that a SCSI device change has taken place and is able to take corrective action without compromising data integrity on either the SCSI device or in the Fibre Channel device attached to Fibre Channel interconnect 200.

Figure 3A:
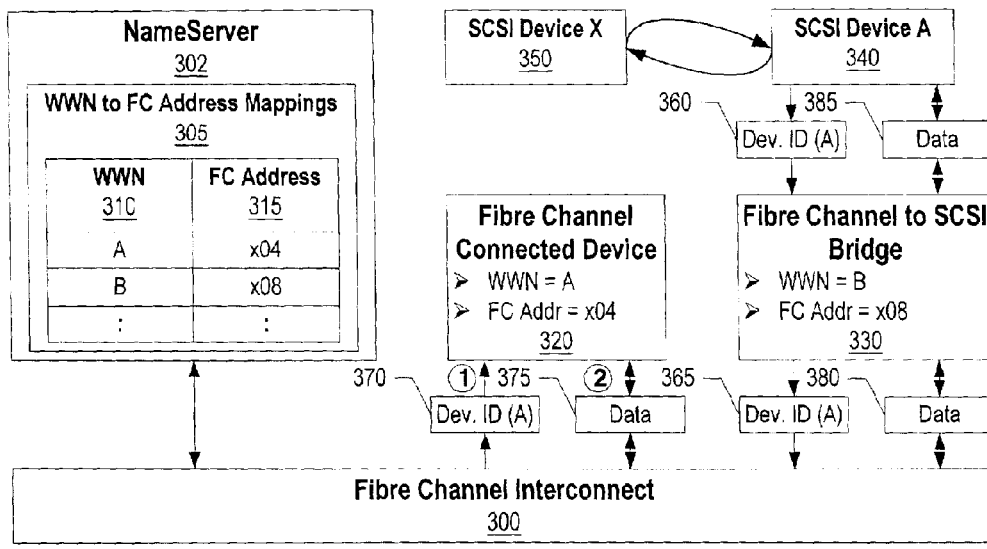
FIG. 3a shows a block diagram of a local Fibre Channel device querying a remote device's unique identifier and subsequently using the remote device.

FIG. 3a shows a block diagram of a local Fibre Channel device using a SCSI device before the device is swapped for another SCSI device. Fibre Channel interconnect 300 is shown with NameServer 302, Fibre Channel Host Device (FC-Device 320), and Fiber Channel to SCSI Bridge (Bridge 330) attached. NameServer 302 includes mappings table 305 that further includes the World Wide Name (WWN 310) and dynamic Fibre Channel Address (FC Address 315) for each attached Fibre Channel device. FC-Device 320 and Bridge 330 each have a World Wide Name and a dynamic Fibre Channel address. In addition, Bridge 330 serves as a gateway between one or more SCSI devices and Fibre Channel interconnect 300. In the example shown, SCSI Device A (340) is currently attached to Bridge 330. When FC-Device 320 wishes to use SCSI Device A (340), it obtains a device identifier associated with SCSI Device A. The device identifier includes the serial number corresponding to the device and may further include the product identifier and vendor identifier corresponding to the device. The vendor identifier is used in case two vendors use an identical serial number, while the product identifier is used in case if a vendor uses the same serial numbers on different lines of products. The device identifier for SCSI Device A is obtained and sent (message 360) from SCSI Device A to Bridge 330. Bridge 330, in turn, sends message 365 (containing SCSI Device A's device identifier) over Fibre Channel interconnect 300 to FC-Device 320. FC-Device 320 receives the device identifier information in incoming message 370 from the Fibre Channel interconnect. On a first use of a SCSI device, FC-Device 320 stores the device identifier to use as a comparator for subsequent operations. During subsequent operations, the device identifier received in incoming message 370 is compared with the previously received and stored serial number. During a first use of a SCSI device, or during subsequent uses where the device identifier is matched successfully, FC-Device 320 sends or receives data from SCSI device A. Data being sent from FC-Device A is sent to Bridge 330 as outgoing data packet 375. Data packet 375 might also include commands or instructions used by SCSI Device A in handling the data. The data packet is received from Fibre Channel interconnect 300 at Bridge 330 as incoming data packet 380. Bridge 330 passes the data onto SCSI Device A 340 as incoming SCSI data 385. Data sent from SCSI Device A 340 to FC-Device 320 travels the opposite direction. In this case, outgoing SCSI data 385 is sent from SCSI Device A 340 to Bridge 330. Bridge 330 sends data packet 380 to Fibre Channel interconnect 300 and addressed to FC-Device 320. FC-Device 320 receives incoming data packet 375 through one of its ports attached to Fibre Channel interconnect 300.

Figure 3B:
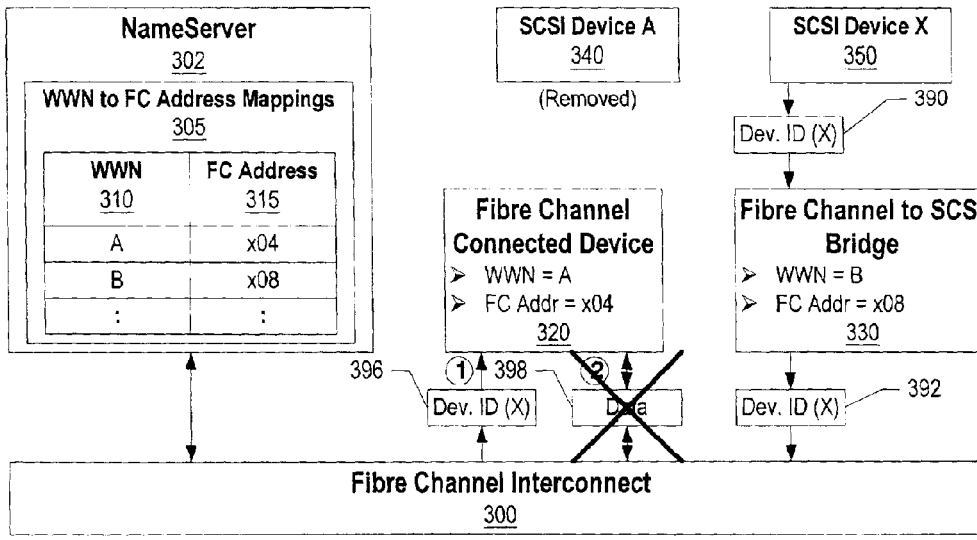
FIG. 3b shows a block diagram illustrating the effect of swapping a remote device for a second remote device.

FIG. 3b shows a block diagram illustrating the effect of swapping SCSI Device X 350 with SCSI Device A 340. In this example, SCSI Device A 340 has been removed from Bridge 330 and is therefore no longer accessible by Bridge 330 and Fibre Channel attached devices communicating with Bridge 330. In its place, SCSI Device X 350 has been attached to Bridge 350. However, SCSI Device x 350 may contain different data than SCSI Device A 340. Because the SCSI devices may not be identical, it may not be safe for a device to use SCSI Device X 350 in place of SCSI Device A 340.

In the example shown, FC-Device 320 had been using SCSI Device A 340 before the SCSI device swap. When FC-Device 320 attempts to use the SCSI device, it first receives a device identifier assigned to the SCSI device. In this case, the device identifier for device X (device identifier 390) is sent from SCSI Device X 350 to Bridge 330. The device identifier is sent from Bridge 330 (serial number 392) to Fibre Channel interconnect with a destination address of FC-Device 320. FC-Device 320 receives the device identifier (device identifier 396) and determines that it is not the same device identifier as the identifier for SCSI Device A, which it had been using. Because the device identifiers do not match, FC-Device 320 does not send or receive data to or from the SCSI device (blocked data communication 398). When this condition arises, the system can take corrective action to ensure that data is not corrupted. For example, the system can alert the user that the SCSI device that was being used is no longer available and prompt the user for the action needed. The system could also perform a comparative analysis to compare the new SCSI device (SCSI Device X 350) with the data previously retrieved from the old SCSI device (SCSI Device A 340) to determine whether the data contained on the devices is identical, or at least compatible, before continuing FC-Device 320's operations.

In an alternative embodiment, the SCSI identifiers are obtained by Bridge 330 whenever a SCSI device change is detected by the Bridge. In this embodiment, the Fibre Channel connected devices can obtain the SCSI device identifiers from the Bridge rather than from the actual SCSI device. In a further embodiment, data sent to the Bridge includes a header that indicates which SCSI device is the intended recipient of the data (containing a SCSI request to store or retrieve data). In this embodiment, the Bridge checks the data header against the actual SCSI identifier and returns an error if the intended identifier supplied by the Fibre Channel device does not match any of the SCSI devices currently attached to the Bridge.

Figure 4:
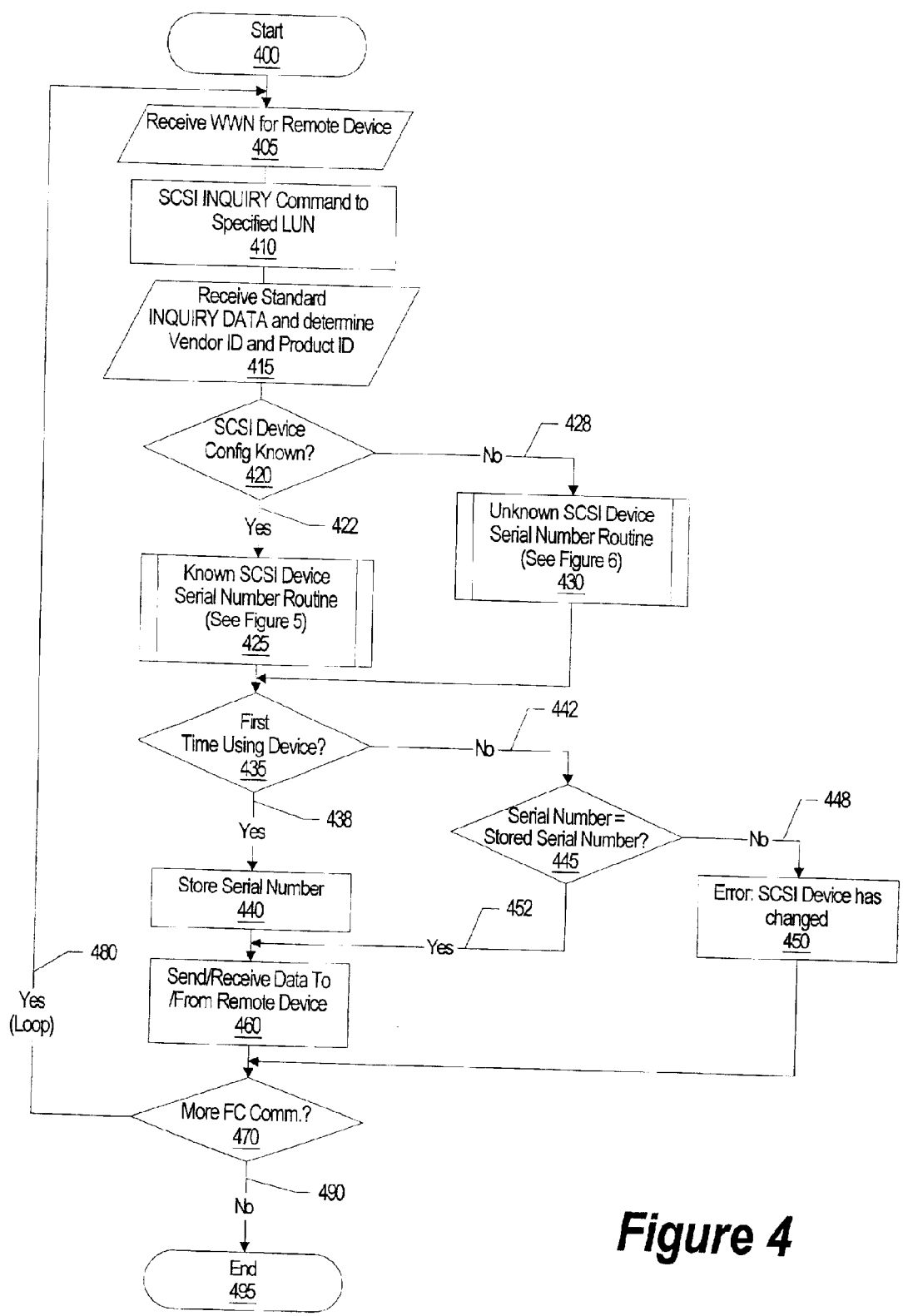
FIG. 4 shows a high level flowchart of a local device obtaining a unique identifier from a remote device and communicating with the remote device.

FIG. 4 shows a high level flowchart of a local device obtaining a unique identifier from a remote device and communicating with the remote device. A World Wide Name (WWN) assigned to the remote device is received from a NameServer entity attached to the Fibre Channel interconnect (input 405). A SCSI INQUIRY command is sent to the remote SCSI device (step 410). In response to the command, standard INQUIRY DATA is retrieved from the SCSI device and the vendor identifier and product identifier corresponding to the SCSI device are extracted (step 415). The vendor identifier and product identifier are used to determine whether the SCSI device configuration is known (decision 420). This decision is performed by comparing the vendor identifier and product identifier with known information about devices stored or accessible by the local device, such as a table containing the vendor identifiers and product identifiers of various devices. If the retrieved vendor identifier and/or product identifier is located in the table of known SCSI devices, "yes" branch 422 is taken whereupon a predefined process is executed to retrieve the serial number from the device (predefined process 425, see FIG. 5 for further details). On the other hand, if the device is not located in the table of known SCSI devices, "no" branch 428 is taken whereupon another predefined process is executed to retrieve the serial number from the unknown SCSI device (predefined process 430, see FIG. 6 for further details).

After the SCSI device's serial number has been retrieved, a determination is made as to whether this is the first time the local device is using the SCSI device (decision 435). This determination is made by keeping track of remote SCSI devices used by the local device. Additional rules, such as treating a SCSI device as a new device following a reboot or power-on-reset of the local device or after a given period of inactivity of the SCSI device can also be used depending upon the application. If this is the first time using the SCSI device, the serial number retrieved by either predefined process 425 or predefined process 430 is stored for future comparisons (step 440). In addition, during step 440 the method used to retrieve the serial number is retained so that future retrievals of the serial number can be handled more efficiently. If this is not the first time using the SCSI device, decision 435 branches to "no" branch 442 whereupon the retrieved device identifier is compared to the previously stored device identifier (decision 445). In one embodiment, the device identifier includes the serial number of the device. In another embodiment, the device identifier includes the serial number in addition to either or both the vendor identifier and/or the product identifier. If the device identifiers are the same, decision 445 branches to "yes" branch 452. On the other hand, if the device identifiers are not the same, indicating that the SCSI device has changed, decision 445 branches to "no" branch 448 and an error condition is reported (step 450). In addition, "no" branch 448 bypasses the sending and receiving of data from the SCSI device in order to avoid corrupting data.

If this is the first time using the SCSI device or if the serial number retrieved matches the previously stored serial number, then data is sent to or received from the SCSI device (step 460). Because the device identifier for the SCSI device has either not changed or it is the first time using the SCSI device, potential data corruption is avoided.

A determination is made whether more Fibre Channel communications are being performed by the local device (decision 470). This decision can be made by determining whether the local device has closed its Fibre Channel communications port or whether the device has entered a quasi-opened mode of operation wherein the device no longer actively participates on the Fibre Channel. While Fibre Channel communications continue, "yes" branch 480 is repeatedly taken looping back to process further Fibre Channel communications. When Fibre Channel communications are completed, decision 470 branches to "no" branch 490 and processing ends at 495.

Figure 5:
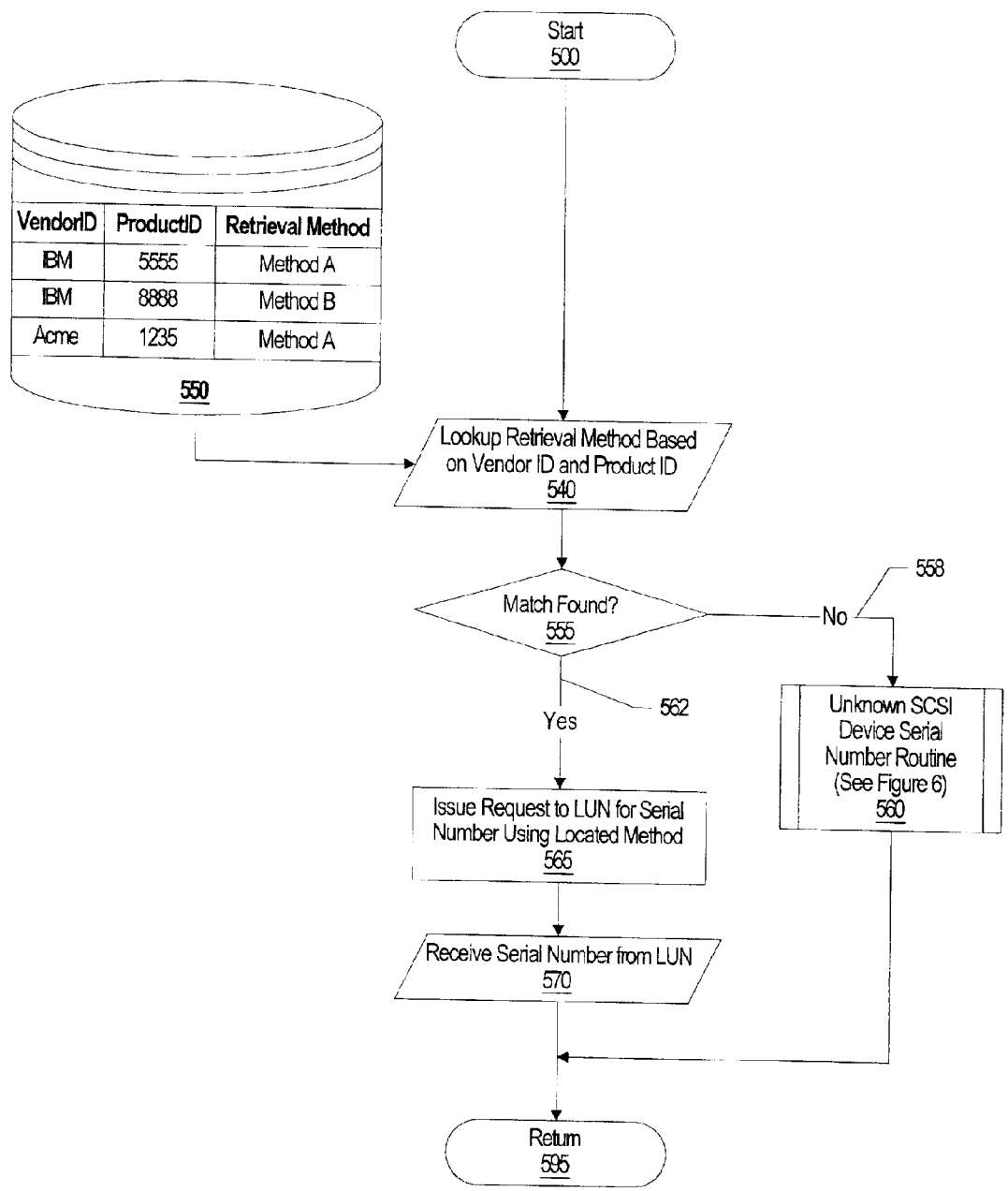
FIG. 5 shows a flowchart for obtaining a unique identifier from a remote device in a known configuration.

FIG. 5 shows a flowchart for obtaining a unique identifier from a remote device in a known configuration. This routine is used when a SCSI device is known based on the SCSI device's vendor identifier and/or product identifier. Processing commences at 500 whereupon the vendor identifier and product identifier are used to retrieve a method to use in order to obtain the serial number from the SCSI device (input 540). Lookup table 550 is used to match against the SCSI device's vendor identifier and product identifier. If a match is not found, decision 555 branches to "no" branch whereupon a predefined process is executed to retrieve the serial number from an unknown configuration (predefined process 560, see FIG. 6 for more details). On the other hand, if a match is found, decision 555 branches to "yes" branch 562 whereupon the method identified in lookup table 550 is used to issue an appropriate command to the SCSI device in order to obtain the device's serial number. The serial number is returned (input 570). Processing returns to the calling routine (Return 595, see FIG. 4, steps 435 to 452 for detail of operations performed after the receipt of the SCSI device serial number).

Figure 6:
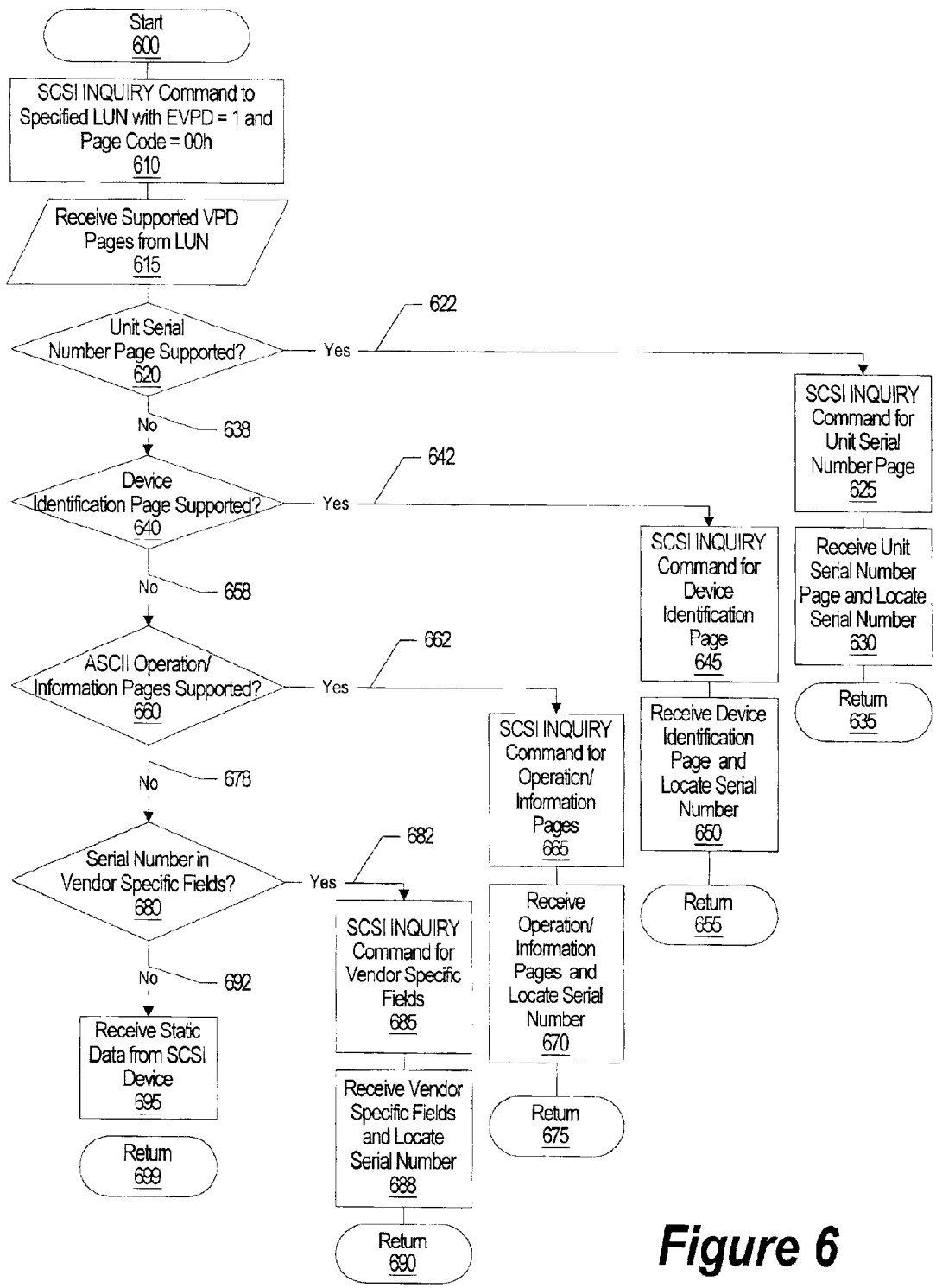
FIG. 6 shows a flowchart for obtaining a unique identifier from a remote device in an unknown configuration.

FIG. 6 shows a flowchart for obtaining a unique identifier from a remote device in an unknown configuration. Processing commences at 600 whereupon a NameServer entity within the Fibre Channel network is queried for the port identifier for the World Wide Name (WWN) device (step 605). If the port identifier is not found, an error condition is reported and processing returns to the calling routine. If the port identifier is found, a SCSI INQUIRY COMMAND is issued to the SCSI device with the Enabled Vital Product Data (EVPD) set to 1 and the Page Code set to 00 h. The Page Code specifies the page of vital product data that will be returned by the SCSI device. Page Code 00 h is used to identify vital product data pages that are supported by the SCSI device. The supported vital product data (VPD) pages are received (input 615) from the SCSI device. If the received VPD indicates that the SCSI device supports a unit serial number page, decision 620 branches to "yes" branch 622 whereupon a SCSI INQUIRY command is sent to the SCSI device requesting the unit serial number page (step 625). The responsive unit serial number page is received from the SCSI device and the serial number is identified within the returned data (step 630) before processing returns to the calling routine (step 635).

If a unit serial number page is not supported, decision 620 branches to "no" branch 638 whereupon a determination is made as to whether the SCSI device supports a device identification page (decision 640). If the SCSI device supports a device identification page, decision 640 branches to "yes" branch 642 whereupon a SCSI INQUIRY command is sent to the SCSI device requesting the device identification page (step 645). The responsive device identification page is received from the SCSI device and the serial number is identified within the returned data (step 650) before processing returns to the calling routine (step 655).

If a device identification page is not supported, decision 640 branches to "no" branch 658 whereupon a determination is made as to whether the SCSI device supports ASCII Operation and Information Pages (decision 660). If the SCSI device supports ASCII Operation and Information Pages, decision 660 branches to "yes" branch 662 whereupon a SCSI INQUIRY command is sent to the SCSI device requesting the ASCII Operation and Information Pages (step 665). The responsive ASCII Operation and Information Pages are received from the SCSI device and the serial number is identified within the returned data (step 670) before processing returns to the calling routine (step 675).

If ASCII Operation and Information Pages are not supported, decision 660 branches to "no" branch 678 whereupon a determination is made as to whether the SCSI device has a serial number in vendor specific fields (decision 680). If the SCSI device includes a serial number in vendor specific fields, decision 680 branches to "yes" branch 682 whereupon a SCSI INQUIRY command is sent to the SCSI device requesting the vendor specific fields that include the device serial number (step 685). The responsive vendor specific field or fields are received from the SCSI device and the serial number is identified within the returned data (step 688) before processing returns to the calling routine (step 690).

If a serial number is not included in vendor specific fields, decision 680 branches to "no" branch 692 whereupon assorted static data is requested and received from the SCSI device (step 695). The static data serves as a "fingerprint" to uniquely identify the SCSI device in light of other SCSI devices. In order to identify static, rather than dynamic, data, multiple SCSI INQUIRY requests can be made over a given time interval. Comparing the returned data can indicate which fields change over time and, therefore, contain dynamic data. Dynamic data areas are not included in the device identifier. The device identifier using static data may contain substantially more data than a device identifier containing a serial number. Because of the increased amount of data and the analysis of the returned data in order to filter out dynamic data, receiving a serial number or other unique product identifier is preferred over using static data. However, if a serial number or unique product identifier cannot readily be determined, a snapshot of static device data from the SCSI device will serve as a device identifier and will identify when a SCSI device has been removed from the Fibre Channel to SCSI Bridge or has been swapped with another SCSI device.

Figure 7:
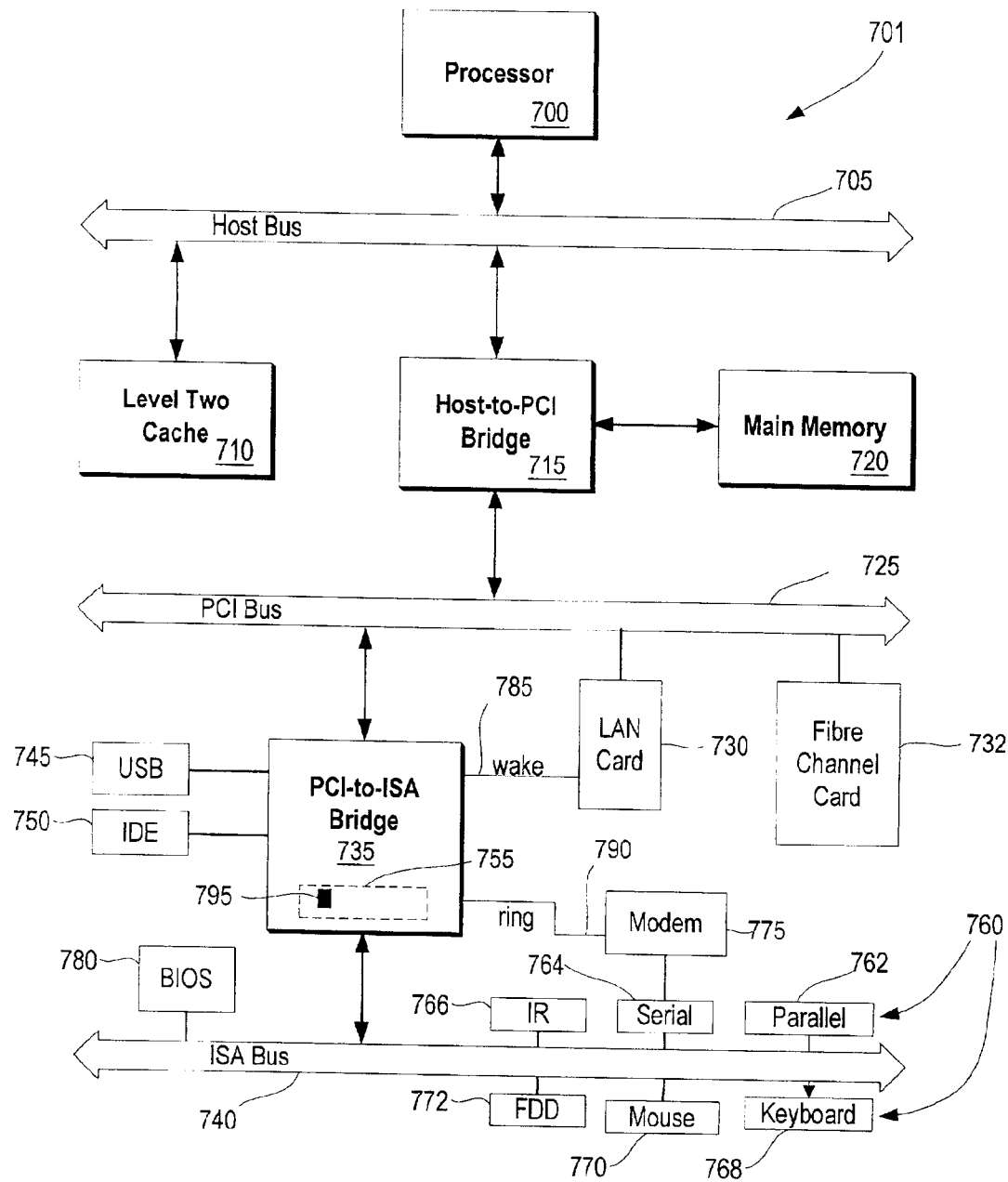
FIG. 7 is a block diagram of an information handling system capable of implementing the present invention.

FIG. 7 illustrates information handling system 701 which is a simplified example of a computer system capable of performing the present invention. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730 and Fibre Channel Card 732. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing methods, or processes, described herein, this computer system is simply one example of a computer system. Those skilled in the art will appreciate that many other computer system designs are capable of performing the copying process described herein.

One of the preferred implementations of the invention is an application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for communicating with a remote device accessible from a Fibre Channel network, said method comprising:

requesting a unique device identifier corresponding to the remote device;

receiving the unique device identifier corresponding to the remote device;

transacting data with the remote device in response to determining that the unique device identifier matches a previously received unique device identifier;

receiving a World Wide Name corresponding to the remote device;

sending an inquiry command to the remote device using the World Wide Name;

receiving responsive data from the remote device; and locating a vendor identifier and a product identifier within the responsive data.

2. The method as described in claim 1 further comprising:

registering an error condition in response determining that the unique device identifier does not match the previously received unique device identifier.

3. The method as described in claim 1 wherein the unique device identifier includes a serial number corresponding to the remote device.

4. The method as described in claim 1 furtther comprising:

requesting a first unique device identifier prior to transacting data with a first remote device;

receiving the first unique identifier; and storing the first unique device identifier as the previously received unique device identifier.

5. The method as described in claim 1 wheirein the remote device includes a SCSI device attached to the Fibre Channel network using a Fibre Channel to SCSI bridge device.

6. The method as described in claim 1 wherein the remote device includes a SCSI device included in a storage enclosure.

7. The method as described in claim 1, further comprising:

determining whether the remote device is a known sevice type matching one or more identifiers from the group consisting of the vendor identifier and the product identifier; and invoking a predefined method to obtain a serial number corresponding to the remote device in response to determining that the remote device is a known device type.

8. The method as described in claim 1 wherein the requesting and the receiving are performed by a bridge device that connects the remote device to the Fibre Channel network.

9. An information handling system comprising:

one or more processors;

a memory accessible by the processors;

a nonvolatile storage device accessible by the processors;

a Fibre Channel adapter operable to connect the information handling system to a Fibre Channel network; and a remote device communication tool for communicating with a remote device accessible from a Fibre Channel network, the remote device communication tool including:

means for requesting a unique device identifier corresponding to the remote device;

means for receiving the unique device identifier corresponding to the remote device;

means for transacting data with the remote device in response to determining that the unique device identifier matches a previously received unique device identifier;

means for receiving a World Wide Name corresponding to the remote device;

means for sending an inquiry command to the remote device using the World Wide Name;

means for receiving responsive data from the remote device; and means for locating a vendor identifier and product identifier within the responsive data.

10. The information handling system as described in claim 9, further comprising:

means for registering an error condition in response determining that the unique device identifier does not match the previously received unique device identifier.

11. The information handling system as described in claim 9 wherein the unique device identifier includes a serial number corresponding to the remote device.

12. The information handling system as described in claim 9 further comprising:

means for requesting a first unique device identifier prior to transacting data with a first remote device;

means for receiving the first unique identifier; and means for storing the first unique device identifier as the previously received unique device identifier.

13. The information handling system as described in claim 9 wherein the remote device includes a SCSI device attached to the Fibre Channel network using a Fibre Channel to SCSI bridge device.

14. The information handling system as described in claim 9 further comprising:

means for determining whether the remote device is a known device type matching one or more identifiers from the group consisting of the vendor identifier and the product identifier; and means for invoking a predefined method to obtain a serial number corresponding to the remote device in response to determining that the remote device is a known device type.

15. A computer program product for communicating with a remote device accessible from a Fibre Channel network, said computer program product comprising:

means for requesting a unique device identifier corresponding to the remote device;

means for receiving the unique device identifier corresponding to the remote device; and means for transacting data with the remote device, in response to determining that the unique device identifier matches a previously received unique device identifier;

means for receiving a World Wide Name corresponding to the remote device;

means for sending an inquiry command to the remote device using the World Wide Name;

means for receiving responsive data from the remote device; and means for locating a vendor identifier and a product identifier within the responsive data.

16. The computer program product as described in claim 15 further comprising:

means for registering an error condition in response determining that the unique device identifier does not match the previously received unique device identifier.

17. The computer program product as described in claim 15 wherein the unique device identifier includes a serial number corresponding to the remote device.

18. The computer program product as described in claim 15 further comprising:
- means for requesting a first unique device identifier prior to transacting data with a first remote device;
- means for receiving the first unique identifier; and
- means for storing the first unique device identifier as the previously received unique device identifier.

19. The computer program product as described in claim 15 wherein the remote device includes a SCSI device attached to the Fibre Channel network using a Fibre Channel to SCSI bridge device.

20. The computer program product as described in claim 15 wherein the remote device includes a SCSI device included in a storage enclosure.

21. The computer program product as described in claim 15 further comprising:
- means for determining whether the remote device is a known device type matching one or more identifiers from the group consisting of the vendor identifier and the product identifier; and
- means for invoking a predefined method to obtain a serial number corresponding to the remote device in response to determining that the remote device is a known device type.

* * * * *

UNITED STATES PATENT AND TRADEMARK OFFICE
CERTIFICATE OF CORRECTION

PATENT NO. : 6,895,453 B2
DATED : May 17, 2005
INVENTOR(S) : Allen et al.

It is certified that error appears in the above-identified patent and that said Letters Patent is hereby corrected as shown below:

Column 15,
Line 22, please delete "furtter" and insert -- further --.
Line 37, please delete "sevice" and insert -- device --.

Signed and Sealed this

Sixteenth Day of August, 2005

JON W. DUDAS
*Director of the United States Patent and Trademark Office*